United States Patent
Craske et al.

(10) Patent No.: US 10,503,512 B2
(45) Date of Patent: Dec. 10, 2019

(54) CONTEXT SENSITIVE BARRIERS WITH AN IMPLICIT ACCESS ORDERING CONSTRAINT FOR A VICTIM CONTEXT

(71) Applicant: ARM LIMITED, Cambridge (GB)

(72) Inventors: Simon John Craske, Cambridge (GB); Alexander Alfred Hornung, Cambridge (GB); Max John Batley, Cambridge (GB); Kauser Yakub Johar, Cambridge (GB)

(73) Assignee: ARM Limited, Cambridge (GB)

( * ) Notice: Subject to any disclaimer, the term of this patent is extended or adjusted under 35 U.S.C. 154(b) by 185 days.

(21) Appl. No.: 14/930,920

(22) Filed: Nov. 3, 2015

(65) Prior Publication Data
US 2016/0139922 A1     May 19, 2016

(30) Foreign Application Priority Data

Nov. 13, 2014    (GB) .................................. 1420173.5

(51) Int. Cl.
*G06F 9/30*    (2018.01)
*G06F 9/38*    (2018.01)
(Continued)

(52) U.S. Cl.
CPC ........ *G06F 9/3834* (2013.01); *G06F 9/30072* (2013.01); *G06F 9/30087* (2013.01); *G06F 9/45533* (2013.01); *G06F 9/52* (2013.01)

(58) Field of Classification Search
CPC ..... G06F 9/30087; G06F 9/3834; G06F 9/522
See application file for complete search history.

(56) References Cited

U.S. PATENT DOCUMENTS

| | | | | |
|---|---|---|---|---|
| 6,079,012 A | * | 6/2000 | Morris | G06F 9/30087 712/216 |
| 7,788,468 B1 | * | 8/2010 | Nickolls | G06F 9/30087 712/22 |

(Continued)

FOREIGN PATENT DOCUMENTS

| | | |
|---|---|---|
| GB | 2 456 813 | 7/2009 |
| JP | 2004-38341 A | 2/2004 |

(Continued)

OTHER PUBLICATIONS

International Search Report and Written Opinion of the International Searching Authority dated Dec. 15, 2015 in PCT/GB2015/052959, 12 pages.

(Continued)

*Primary Examiner* — David J. Huisman
(74) *Attorney, Agent, or Firm* — Nixon & Vanderhye P.C.

(57) ABSTRACT

Apparatus for data processing and a method of data processing are provided, according to which the processing circuitry of the apparatus can access a memory system and execute data processing instructions in one context of multiple contexts which it supports. When the processing circuitry executes a barrier instruction, the resulting access ordering constraint may be limited to being enforced for accesses which have been initiated by the processing circuitry when operating in an identified context, which may for example be the context in which the barrier instruction has been executed. This provides a separation between the operation of the processing circuitry in its multiple possible contexts and in particular avoids delays in the completion of the access ordering constraint, for example relating to accesses to high latency regions of memory, from affecting the timing sensitivities of other contexts.

16 Claims, 6 Drawing Sheets

(51) Int. Cl.
*G06F 9/455* (2018.01)
*G06F 9/52* (2006.01)

(56) References Cited

U.S. PATENT DOCUMENTS

| | | | |
|---|---|---|---|
| 2002/0169947 | A1 | 11/2002 | Bilardi et al. |
| 2009/0157943 | A1* | 6/2009 | Robinson ............ G06F 12/0875 711/100 |
| 2010/0011195 | A1 | 1/2010 | Ishii |
| 2011/0078417 | A1* | 3/2011 | Fahs .................. G06F 9/30145 712/216 |
| 2011/0191542 | A1 | 8/2011 | Vash et al. |
| 2014/0118362 | A1 | 5/2014 | Hakura et al. |
| 2014/0365734 | A1* | 12/2014 | Bridge, Jr. .......... G06F 12/0891 711/144 |
| 2016/0092677 | A1* | 3/2016 | Patel ...................... G06F 21/55 726/23 |

FOREIGN PATENT DOCUMENTS

| | | |
|---|---|---|
| JP | 2004-527054 A | 9/2004 |
| JP | 2005-521924 A | 7/2005 |
| JP | 2009-176297 A | 8/2009 |
| JP | 2010-20363 A | 1/2010 |
| WO | WO 2008/155806 | 12/2008 |

OTHER PUBLICATIONS

Christopher von Praun, et al., "Conditional Memory Ordering", *ISCSA '06*, Jun. 17, 2006, 12 pages.
Search Report for GB1420173.5 dated May 12, 2015, three (3) pages.
Office Action for JP Application No. 2017-523951 dated Jul. 17, 2019 and English translation, 20 pages.
Office Action for TW Application No. 104135634 dated Oct. 2, 2019 and English translation, 13 pages.

* cited by examiner

CTX A:
1    STR r2, [...long latency address]
CTX D:
2    STR r3, [...long latency address]
CTX B:
3    STR r0, [...LOW latency address]
4    DSB
CTX C:
5    STR r1, [...long latency address]
6    DSB

FIG. 6A

CTX A:
1    TLBIALLNSNH
CTX B:
2    STR r0, [...LOW latency address]
3    DSB
CTX C:
4    STR r1, [...long latency address] / or: e.g TLBIMVAA
5    DSB

FIG. 6B

CONTEXT SENSITIVE BARRIERS WITH AN IMPLICIT ACCESS ORDERING CONSTRAINT FOR A VICTIM CONTEXT

This application claims priority to GB1420173.5 filed Nov. 13, 2014, the entire content of which is hereby incorporated by reference.

TECHNICAL FIELD

The present disclosure relates to data processing. More particularly, relates to the use of barrier instructions in a data processing apparatus.

BACKGROUND

A data processing apparatus which executes data processing instructions in order to carry out, or delegate, data processing operations is known to be arranged to be responsive to a barrier instruction. A barrier instruction causes the data processing apparatus to ensure that a particular access ordering constraint is enforced, that is to say the barrier instruction ensures that instructions which precede the barrier instruction in the sequence of data processing instructions which the data processing apparatus executes complete, i.e. can be assured take effect within the memory system accessed, before the data processing apparatus can execute instructions in the sequence of data processing instructions which follow the barrier instruction. This can for example be useful to ensure that the content of the memory system is up-to-date and coherent with respect to the current processing status of the data processing apparatus when it encountered the barrier instruction.

The present disclosure relates to improvements in how the data processing apparatus responds to encountering such a barrier instruction.

SUMMARY

Viewed from a first aspect, there is provided an apparatus for data processing comprising: processing circuitry to execute data processing instructions to perform data processing operations, wherein the data processing operations comprise accessing a memory system, and Wherein the processing circuitry is capable of executing the data processing instructions in a plurality of contexts; and memory system interaction circuitry to provide an interface between the processing circuitry and the memory system, wherein the memory system interaction circuitry is capable of, in response to the processing circuitry executing a barrier instruction in a current context of the plurality of contexts, enforcing an access ordering constraint, and wherein the memory system interaction circuitry is capable of limiting enforcement of the access ordering constraint to accesses initiated by the processing circuitry when operating in an identified context.

Viewed from a second aspect, there is provided a method of data processing comprising the steps of: executing data processing instructions to perform data processing operations, wherein the data processing operations comprise accessing a memory system, and the data processing instructions are executed in a current context of a plurality of contexts; in response to execution of a barrier instruction in the current context of the plurality of contexts, enforcing an access ordering constraint; and limiting enforcement of the access ordering constraint to accesses initiated when executing data processing instructions in an identified context.

Viewed from a third aspect, there is provided an apparatus for data processing comprising: means for executing data processing instructions to perform data processing operations, wherein the data processing operations comprise accessing a memory system, and the data processing instructions are executed in a current context of a plurality of contexts; and means for providing an interface between the processing circuitry and the memory system, wherein the means for providing an interface is capable of, in response to the means for executing data processing instructions executing a barrier instruction in the current context of the plurality of contexts, enforcing an access ordering constraint, and wherein the means for executing data processing instructions is capable of limiting enforcement of the access ordering constraint to accesses initiated by the processing circuitry when operating in an identified context.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

The present techniques recognise that where the processing circuitry of the data processing apparatus is capable of executing (i.e. has a configuration which enables it to execute) data processing instructions in more than one context, it is advantageous to modify the manner in which the data processing apparatus responds to a barrier instruction in dependence on the context in which the processing circuitry executes data processing instructions. Here, a "context" should be understood as an operating environment in which the data processing apparatus can operate, according to which the components of the data processing apparatus are provided with an apparently complete and self-consistent view of not only the components of the data processing apparatus itself, but of the whole of the data processing system in which the data processing apparatus is found, for example further including a memory system to which the data processing apparatus is connected. The word "apparently" is used here to indicate that, for example, the memory system with which the data processing apparatus interacts may in fact contain a wider range of address locations than the processing circuitry of the data processing apparatus is able to see when operating in a particular context, yet the processing circuitry, when operating in that particular context, has no awareness that other inaccessible memory locations in the memory system exist. The barrier instruction may for example be a memory barrier instruction, or may for example be a synchronization barrier, which synchronizes not only memory accesses but also other relevant operations, such as coherency operations. For example a branch predictor or TLB maintenance operation will result in a DVM message, and a synchronization barrier will synchronize these accesses as well.

According to the present techniques, when the processing circuitry of the data processing apparatus encounters a barrier instruction, the data processing apparatus may respond by limiting enforcement of a corresponding access ordering constraint only for accesses which have been initiated by the processing circuitry when operating in an identified context, which may for example be the current context, i.e. accesses previously initiated in the same context as the context in which the processing circuitry is currently operating and has encountered the barrier instruction. In other words enforcement of the access ordering constraint may be limited to accesses initiated by the processing circuitry when operating in an identified context. The accesses may take a variety of forms, and can for example be memory accesses such as a store or a load, and can also for example be coherency operations or cache (data or instruction) maintenance operations.

This has the advantage of further reducing the influence that the presence of multiple possible contexts within the data processing apparatus may have on the operation of the data processing apparatus when the processing circuitry is executing data processing instructions in a given context of those multiple contexts. For example, one situation in which this technique may be particularly beneficial is where one context provided in the data processing apparatus is used for the operation of the processing circuitry when the data processing apparatus is required to execute its data processing instructions and respond to external signals with very little delay (a "real time context") and is arranged to operate in another context in which some delay in completion of execution of its data processing instructions and in responding to external signals is acceptable (a "non-real time context"). By arranging the data processing apparatus such that the access ordering constraint carried out when the processing circuitry encounters a barrier instruction in a given context is enforced for accesses which have been initiated by the processing circuitry when operated in that particular context, the timing constraints of the context which is sensitive to delay (the real time context) are better protected, in that the operation of the processing circuitry when operating in this context will not be slowed down by waiting for completion of accesses (in order to adhere to the access ordering constraint) which have been initiated by the processing circuitry when operating in a different context which does not have such tight timing constraints, and may therefore involve accesses which could potentially involve greater delay than is acceptable for the "real time" context, for example access to an external memory which is known to have a relatively long latency of response.

In one embodiment the identified context is the current context. The current context can be communicated to the components which enforce the access ordering constraint in a variety of ways.

In one embodiment the identified context is specified in the barrier instruction. This gives the programmer (and/or the hypervisor) the flexibility to enforce the access ordering constraint for a selected context at any time.

In one embodiment the identified context is specified in storage accessible to the processing circuitry. For example an indication of the identified may be stored in a register (although any other suitable storage may also be used).

In one embodiment the apparatus is capable of providing a virtualized operating environment in which a current virtual machine of multiple virtual machines operates, wherein the processing circuitry is capable of executing the data processing instructions by interaction with the current virtual machine, and wherein the current context corresponds to the current virtual machine. Accordingly, a virtualized operating environment provides one manner in which the processing circuitry of the data processing apparatus can operate (i.e. execute data processing instructions) in more than one context. A given virtual machine (typically comprising a particular guest operating system and set of applications which run on that guest operating system) interacts with the hardware of the data processing apparatus (i.e. in particular in the present context the processing circuitry and memory system interaction circuitry) when operation of that virtual machine is the present context of operation for the data processing apparatus. The present techniques therefore provide protection for the timing constraints of each of the virtual machines (and in particular a virtual machine with a low-delay timing constraint).

In some embodiments, the apparatus further comprises virtual machine identifier storage for storing a virtual machine identifier, wherein the apparatus is capable of updating the virtual machine identifier to indicate the current virtual machine. The virtual machine identifier storage may for example be provided by a register in the processing circuitry of the data processing apparatus, although could also be provided by any other suitable form of identifier storage, and thus provides the data processing apparatus with a readily available and reliable reference for components of the apparatus to determine the current virtual machine.

In some embodiments the memory system interaction circuitry comprises a store buffer to buffer pending accesses and the store buffer is capable of tagging each pending access with an identifier indicative of the context from which that pending access was issued. The provision of a store buffer to buffer pending accesses enables the existing circuitry to delegate the administration of accesses (which may typically have at least a small delay before they complete) whilst the processing circuitry continues with other data processing instruction execution. The tagging of each pending access buffered in the store buffer indicates the context from which that pending access was issued. It should be noted that, despite its name, the store buffer may not only handle "store" accesses, but also, for example, other accesses such as coherency operations.

This enables the store buffer to distinguish pending accesses initiated by the data processing circuitry for each of the contexts in which the data processing circuitry is able to operate.

In some embodiments the store buffer is capable of limiting enforcement of the access ordering constraint to pending accesses tagged with the identifier indicative of the context from which that pending access was issued which matches the current context. This enables the store buffer, when an access ordering constraint is to be enforced (when the processing circuitry executes the barrier instruction), to determine those accesses which have been initiated by the processing circuitry when operating in the current context (and for which the access ordering constraint should therefore be carried out) and those accesses initiated by the processing circuitry when operating in a different context (and therefore for which it may not be desirable for the access ordering constraint to be carried out).

In some embodiments, the memory system interaction circuitry further comprises a coherency unit and the store buffer is capable of interacting with the memory system via the coherency unit. Interaction with the memory system via a coherency unit enables coherency between the data processing apparatus accessing the memory system and other data processing apparatuses which are also accessing the same memory system and between the storage devices of respective memory hierarchies, and where the store buffer interacts with a memory system via the coherency unit the implementation of a selective access ordering constraint enforcement (in dependence on the context) can be provided by selective filtering of the messages which the store buffer sends to the coherency unit. The coherency unit may for example be a snoop control unit.

In some embodiments the store buffer comprises a context tracking storage with multiple storage locations, and wherein the store buffer is capable of storing an entry in one of the multiple storage locations for the current context if the current context has initiated accesses since the access ordering constraint was last enforced for the current context. The provision of this context tracking storage thus provides the store buffer with the ability to readily determine whether the access ordering constraint needs to be enforced at all for the current context.

In some embodiments the store buffer is capable of clearing a selected entry in the context tracking storage when the access ordering constraint corresponding to the selected entry has been enforced. Thus once the access ordering constraint has been enforced for a given context, clearing the corresponding entry in the context tracking storage at that point ensures that if and when a further barrier instruction is executed in that context, the store buffer can readily recognise that the access ordering constraint does not need to be carried out with regard to those previous accesses which have been subject to actions resulting from the previous barrier instruction.

In some embodiments if all of the multiple storage locations in the context tracking storage are occupied and the store buffer does not have an occupied entry for the current context, the store buffer is capable of enforcing an implicit access ordering constraint for pending accesses initiated by a victim context other than the current context which has a corresponding victim entry, and clearing the victim entry for the selected context, wherein the implicit access ordering constraint does not require the processing circuitry to execute a corresponding barrier instruction. Whilst the store buffer could be provided with a context tracking storage with sufficient storage locations for all possible contexts in which the processing circuitry can execute data processing instructions, it may be the case that the number of contexts supported by the data processing apparatus exceeds the number of storage locations which it is desirable to provide in the context tracking storage. In other words, in order to keep the size of the store buffer as small as possible, it may be desirable to limit the number of storage locations in the context tracking storage to a relatively small number. In this situation it is recognised that the store buffer may not have an occupied entry for the current context, and may not have an available entry which can immediately be used for the current context. In that situation, when an entry is required for the current context the storage buffer can then enforce an implicit access ordering constraint ("implicit" in the sense that this is not instructed by the processing circuitry by execution of a barrier instruction, but is initiated by the store buffer itself in order to free up an entry in its context tracking storage). One or more victim contexts other than the current context is/are selected by the store buffer to be subject to such an implicit access ordering constraint in order to free up one or more entries in the context tracking storage.

In some embodiments, the store buffer is capable of storing at least one indication associated with each entry in the context tracking storage indicative of whether the accesses initiated since the access ordering constraint was last enforced for that context comprise at least one type of access. This enables the store buffer to distinguish between different types of access which may be initiated by the processing circuitry in a given context, and which may have different requirements with respect to the enforcement of a access ordering constraint.

In some embodiments, the apparatus is capable of limiting enforcement of the access ordering constraint to a selected type of pending access initiated by execution by the current context of a corresponding type of access instruction when the current context has executed the corresponding type of access instruction since the access ordering constraint for the current context was last carried out. In other words, the apparatus may enforce an access ordering constraint for a selected type of pending access initiated by execution by the current context of a corresponding type of access instruction only if the current context has executed the corresponding type of access instruction since the access ordering constraint for the current context was last carried out. Hence, the apparatus is thus able to distinguish between different types of accesses initiated by the execution of corresponding different types of access instruction by the processing circuitry, and to make the enforcement of the access ordering constraint further dependent on the type of access. This is because it is recognised by the present techniques that different types of access may be somewhat independent from one another and enforcement of an access ordering constraint for one type of access instruction may not in fact require pending accesses initiated by a different type of access instruction to be involved in the enforcement of the access ordering constraint.

In some embodiments the selected type of pending access is a store operation. Depending on the expected latency of store operations in the data processing system, store operations may represent a type of (memory) access where it is beneficial to enforce the access ordering constraint only for store operations initiated by the current context, due to the fact that such store accesses may have a significant latency associated with them.

In some embodiments, the memory system interaction circuitry is capable of limiting enforcement of the access ordering constraint when the store operation is to a selected memory region. As such the memory interaction circuitry may enforce the access ordering constraint only if the store operation is to a selected memory region. Whilst the select type of access could be all store operations, the present techniques recognise that it may be a particular component of the memory system which has an associated high latency (and other portions of the memory system may have an acceptably low latency) and thus the memory system interaction circuitry can recognise accesses to that higher latency portion of the memory by means of a selected memory region (e.g. range of memory addresses) associated with it. This may also be identified by identification of stores which access a particular port (or ports) in the data processing system, which is/are known to provide access to a high-latency component of the memory system.

In some embodiments, the selected type of pending access is a coherency operation. The coherency operations can, for example, comprise cache maintenance operations, translation lookaside buffer (TLB) maintenance operations, branch predictor maintenance operations, and so on. The present techniques recognise that such coherency operations may involve a relatively high latency of completion and are therefore a type of access for which the present techniques are of particular benefit.

Figure 1:
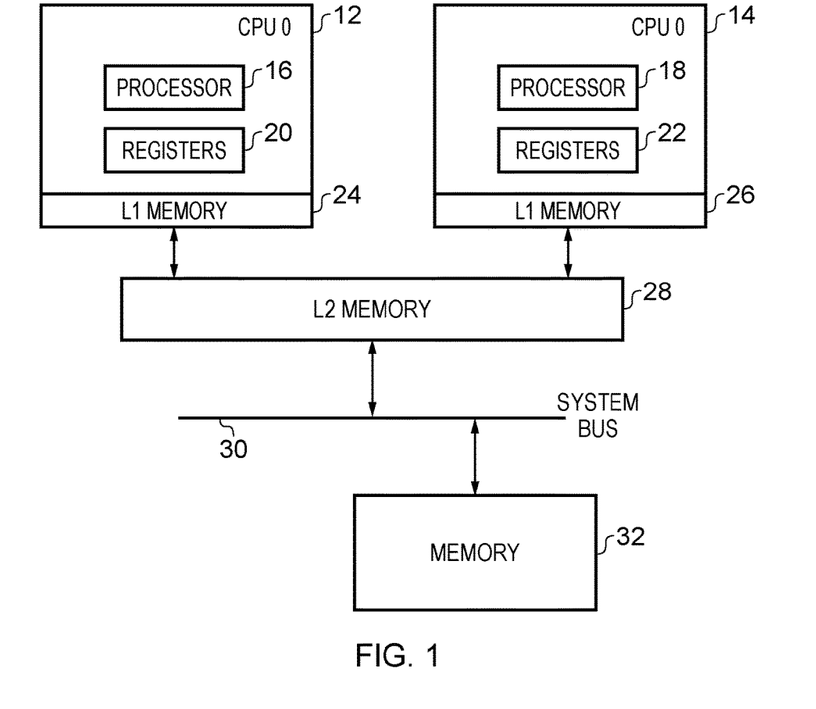
FIG. 1 schematically illustrates a data processing system comprising two data processing apparatuses and a memory system in one embodiment.

FIG. 1 schematically illustrates a data processing system 10 in one embodiment, which comprises two central processing units (CPUs) 12 and 14. Each CPU comprises a processor 16, 18 respectively which executes a sequence of data processing instructions in order to carry out or initiate data processing operations within the data processing system 10, and also comprises a set of registers 20, 22 respectively in which values used by the processors 16, 18 in their data processing operations are stored. Each CPU 12, 14 has a closely associated Level 1 (L1) memory system (cache) which is capable of storing (i.e. has a configuration which enables it to store) temporary copies of data items retrieved from the remainder of the memory system of the data processing system 10, in order to reduce the access latency for those data items, in a manner with which the skilled person will be familiar. The respective L1 memories 24, 26 of each data processing apparatus 12, 14 interacts with a Level 2 (L2) memory 28, which itself interacts with an external memory 32 via a system bus 30, in a hierarchical configuration of this set of caches and memories, again with which the skilled person will also be familiar.

Figure 2:
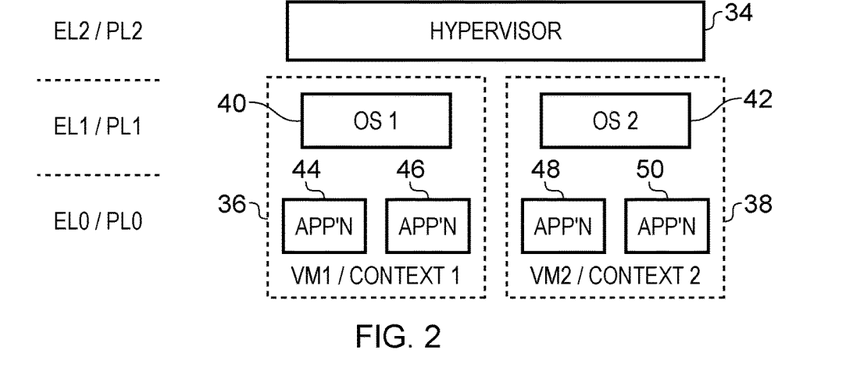
FIG. 2 schematically illustrates the structure of a virtualized operating environment which runs on one or more data processing apparatuses such as those shown in FIG. 1, in one embodiment.

FIG. 2 schematically illustrates one feature of the data processing system 10 shown in FIG. 1, namely that the data processing apparatuses 12 and 14 of the data processing system 10 support virtualized operating environments. These virtualized operating environments may be viewed in the hierarchical manner schematically shown in FIG. 2, in which a hypervisor 34 which maintains overall control of the virtualization thus provided operates at the highest privilege level shown in the figure referred to as "exception level number 2" (EL2) or "privilege level 2" (PL2)). A further, higher privilege level (EL3) may also be provided, where for example a secure monitor operates. The hypervisor operates at the highest non-secure privilege level, and the privilege level that manages-virtualization. The hypervisor controls which of several virtual machines is currently operating in the data processing apparatus. For clarity of illustration only FIG. 2 just shows two virtual machines 36 and 38, but it should be appreciated that the data processing apparatus can be configured to support many more virtual machines. Each virtual machine is represented in FIG. 2 by an operating system (OS1 40 and OS2 42 respectively) and a number of applications running under control of that operating system 44, 46 and 48, 50 respectively. Again, for clarity of illustration only, only two applications are shown within each virtual machine, but there may in fact be many more applications which each virtual machine is capable of running. The guest operating systems 40 and 42 typically operate at an intermediate level of privilege (EL1/PL1) whilst the applications typically operate at a lowest level of privilege (EL0/PL0). Each virtual machine which may run on the data processing apparatus thus represents a distinct context in which the data processing apparatus, and in particular the processor (processing circuitry) of the data processing apparatus can operate. Note that the virtual machines may be hosted by just one data processing apparatus or may be distributed across several, depending on the processing resource which it is appropriate to make available to each virtual machine. Where a real-time virtual machine is to be provided it is more likely to be restricted to just one data processing apparatus, whilst a non real-time virtual machine may be configured to be distributed across several data processing apparatuses.

Figure 3A:
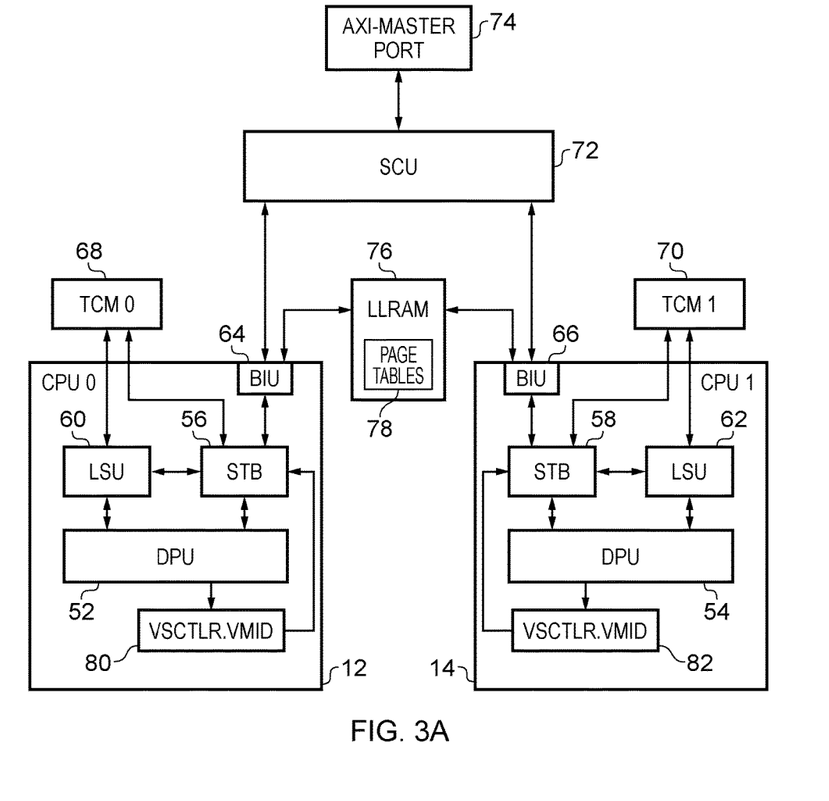
FIG. 3A schematically illustrates in more detail some of the components of the data processing system of FIG. 1 in one embodiment.

FIG. 3A schematically illustrates in more detail the configuration of the data processing apparatuses 12 and 14 shown in FIG. 1 and some further components of the data processing system 10. Each data processing apparatus 12, 14 comprises a data processing unit (execution unit/processing circuitry) 52, 54 which executes data processing instructions to perform or initiate data processing operations. Where the data processing instructions/operations comprise accessing the memory system, each DPU 52, 54 does this via interaction with a respective load store unit (LSU) 60, 62 and store buffer (STB) 56, 58. As discussed with reference to FIG. 2 each data processing apparatus 12, 14 operates in a current context (i.e. under control of a hypervisor 34 enabling a selected virtual machine to be operating), and the respective DPUs 52, 54 store a value in the register VSCTL-R.VMID 80, 82 which serves as a virtual machine identifier and indicates the current virtual machine running on the respective data processing apparatus. The LSU and STB of each data processing apparatus can interact with a variety of storage components of a memory system, which may in particular have rather different access latencies associated with them. For example, each data processing apparatus 12, 14 is provided with access to a tightly coupled memory (TCM) 68, 70 respectively which each have a low access latency. Similarly, the data processing apparatuses 12, 14 share access to a low latency RAM (LL RAM) 76 which also has a low access latency. Nevertheless, the LLRAM 76 may also be used to store page tables 78, for which some maintenance operations may have a longer latency associated with them. When this is the case regular per-port memory ordering wouldn't be sufficient to avoid the delays to particular contexts which the present techniques seek to avoid, since it is recognised by the present techniques that any coherency operation directly or indirectly related to those page tables in LLRAM should be treated as a different class of access (i.e. high latency) from normal LLRAM loads and stores (which are low-latency accesses).

Each data processing apparatus 12, 14 also shares access to a coherency unit, embodied in this example by snoop control unit (SCU) 72 which forms part of the L2 memory system 28 and in particular provides access to a bus access port 74, which in this embodiment is an AXI master port, as provided by ARM Limited, Cambridge UK, and the SCU also maintains coherency between all the cores/processing elements in the cluster (see also FIG. 1). This AXI master port 74 provides access to the external memory 32 via the AXI system bus 30 and thus has a significantly higher access latency associated with it than for example the TCMs 60, 78 or the LLRAM 76. The STBs 56, 58 of each data processing apparatus interact with the shared SCU 72 and the shared LLRAM 76 via, a respective local bus interface unit (BIU) 64, 66 respectively.

Figure 3B:
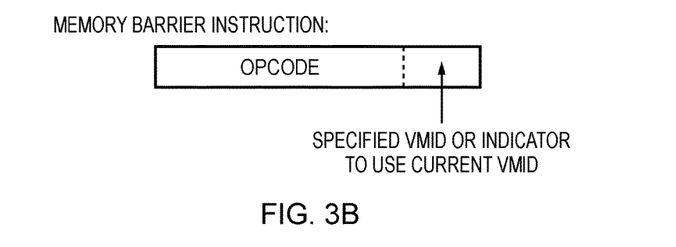
FIG. 3B illustrates a barrier instruction in one embodiment.

FIG. 3B schematically illustrates an example barrier instruction, which comprises an opcode portion identifying this instruction as a barrier instruction to the data processing apparatus and a VMID usage portion which may specify whether the barrier instruction should be applied to the current VMID (as for example given by the content of the VSCTLR.VMID register) or may explicitly specify a VMID value to which the barrier instruction should be applied. Instead of being encoded in the barrier instruction, the VMID value to which the barrier instruction should be applied may be stored in a register (see 20 and 22 in FIG. 1).

Figure 4:
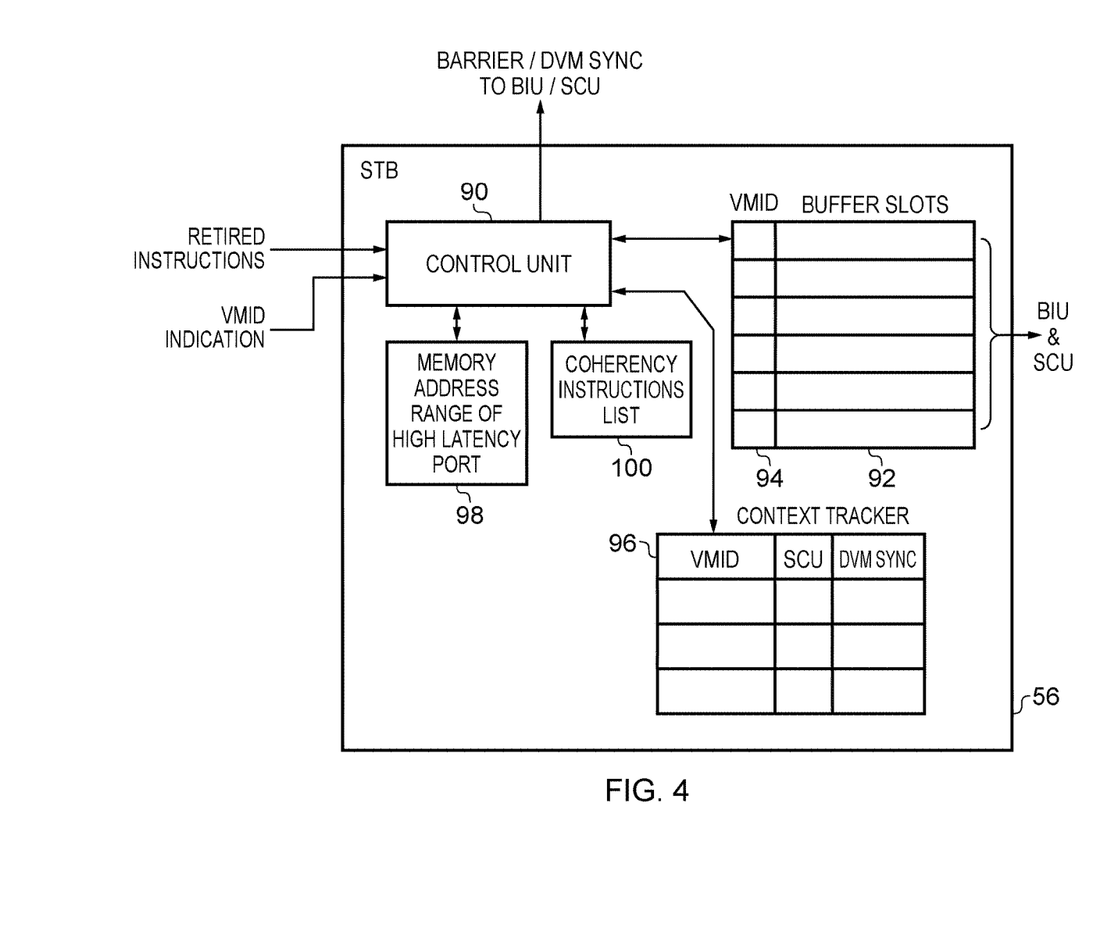
FIG. 4 schematically illustrates in more detail the configuration of each store buffer within each data processing apparatus of FIG. 3A in one embodiment.

FIG. 4 schematically illustrates in more detail the configuration of the store buffer 56 shown in FIG. 3A. Note that the store buffer 58 has a similar configuration. All store operations, cache maintenance operations, TLB maintenance operations and so on are tagged with the current VMID value (retrieved from the VMID register 80 or as explicitly specified in the barrier instruction or as an indication in storage such as a register) in the L1 memory system and go through the STB 56. In other words, corresponding instructions retired from the processing circuitry (DPU) 52 and an associated VMID indication are received by the STB 56. These are first received by a control unit 90 which administers overall control of the store buffer. The store buffer 56 further comprises a number of store buffer slots 92 in which pending accesses are temporarily stored before being passed onto the remainder of the memory system. Each store buffer slot is marked with an indication 94 of the virtual machine identifier which was received in association with the corresponding retired instruction and which set up this corresponding pending access. The store buffer further comprises a context tracker 96 which the store buffer uses to keep track of which VMIDs (contexts) have accessed the high latency AXI master port 74 (via the SCU 72) or have performed D-cache maintenance operations (labelled "SCU") and which VMIDs have sent a distributed virtual memory (DVM) message (labelled "DVM sync"). The DVM messages may for example relate to I-cache maintenance, branch predictor maintenance and TLB maintenance. The DVM syncs are effectively the DVM messages that enforce the ordering constraint. Here, the context tracker only has a relatively limited number of entries available for this storage, being three as illustrated in FIG. 4, enabling the store buffer 56 to be provided as a relatively small component of the data processing apparatus 12. The control unit 90 has further access to indications of memory address range of the high latency AXI master port 98 such that it can identify when a retired store instruction relates to an access via the SCU 72 to the AXI master port 74, and also has access to a list of coherency instructions 100, i.e. those instructions which result in a DVM message, Note that some "coherent" memory accesses to may not actually access the AXI-M port, for example a store to a certain coherent address (which is in the range of AXI-M addresses) may well be satisfied by a local cache access, an L2 cache accesses, or a snoop to another core's cache(s), without ever accessing the AXI-M port.

This described configuration of FIG. 4 enables the store buffer, when a barrier instruction is retired and received by the control unit 90 to limit application of that barrier to store buffer slots with a matching VMID, and thus limit enforcement of the access ordering constraint in response to the barrier instruction to pending accesses which have a corresponding entry in a store buffer slot which were initiated by the DPU 52 when operating in the same context (i.e. with the same virtual machine running as indicated by the VMID value). However note that the store buffer can also be responsive to an explicit VMID specification encoded in the barrier instruction (e.g. as described above with reference to FIG. 3B) to enforce an access ordering constraint only for that VMID. In addition it should be noted that the hypervisor has access to a "strong" barrier which can enforce the ordering constraint for all virtual machines (VMIDs/contexts). Also it should be noted that the ordering constraint applies not just to currently pending memory accesses, but in general any sort of access which might not have completed, in the sense that it has become visible to other processing elements (cores). In other words, it might have completed as far as this core is concerned (and hence isn't pending anymore), but not all of its effects have become visible yet to other observers (e.g. other cores). A barrier needs to enforce this ordering constraint regardless of it still being pending (in the STB) or not.

The configuration of the context tracker 96 enables the store buffer to only send a DVM synchronisation message on to the remainder of the memory system when a barrier instruction is retired, if the context that the barrier instruction applies to (i.e. its associated VMID indication) has sent DVM messages since the last DVM synchronisation was carried out. This is done by maintenance of an indication in the context tracker relating to DVM synchronisation, which will be described in more detail with a respect to FIGS. 5A and 5B. Similarly, this configuration of the context tracker 96 enables the store buffer 56 to only propagate the barrier to the SCU 72 (in order to barrier all other outstanding AXI master accesses from the CPU 12) if the context that the barrier applies to (i.e. its associated VMID indication) has sent AXI master stores or cache maintenance operations to the SCU since the last barrier operation was carried out for the relevant context (VMID). Further detail of the maintenance of the content of the context tracker 56 which supports this will be described with reference to FIGS. 5A, 5B, 6A and 6B.

Figure 5A:
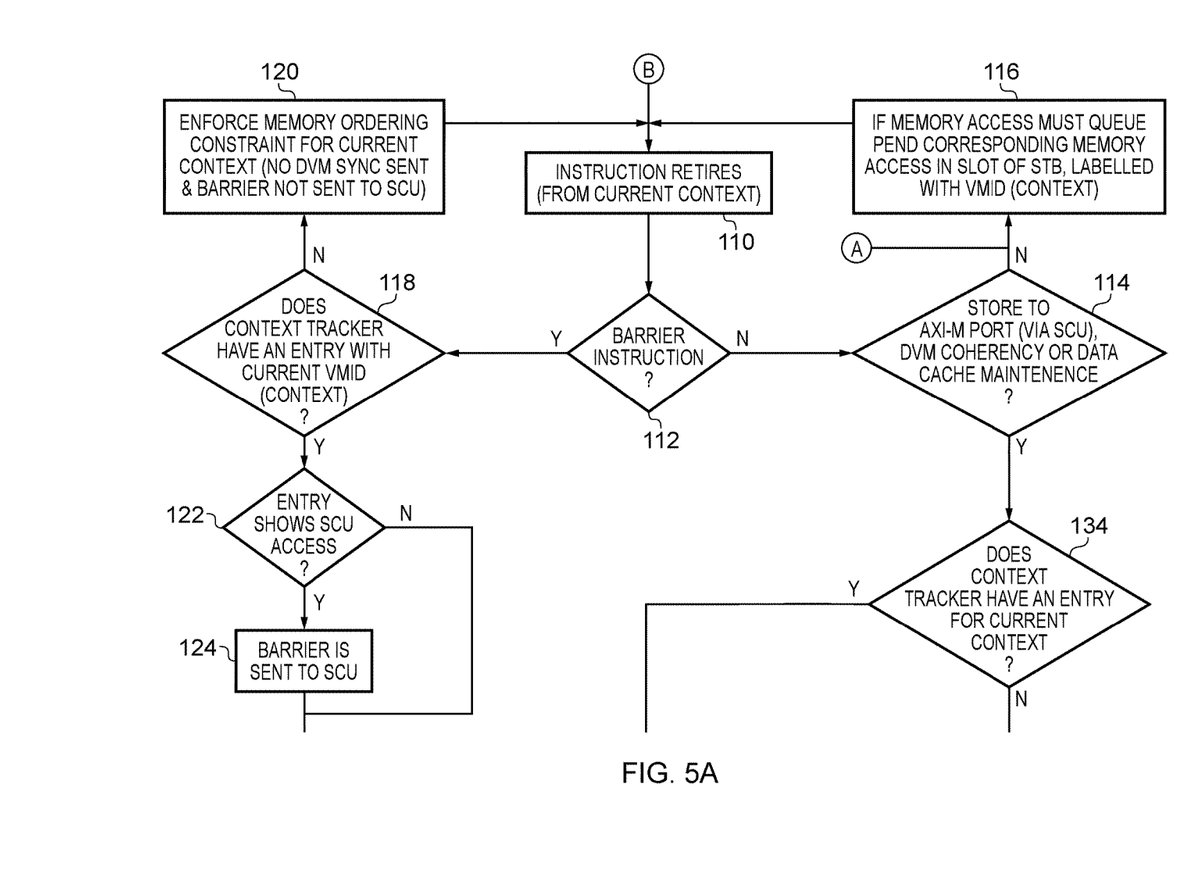
FIGS. 5A and 5B show a sequence of steps carried out by a store buffer such as that illustrated in FIG. 4 in one embodiment.
Figure 5B:
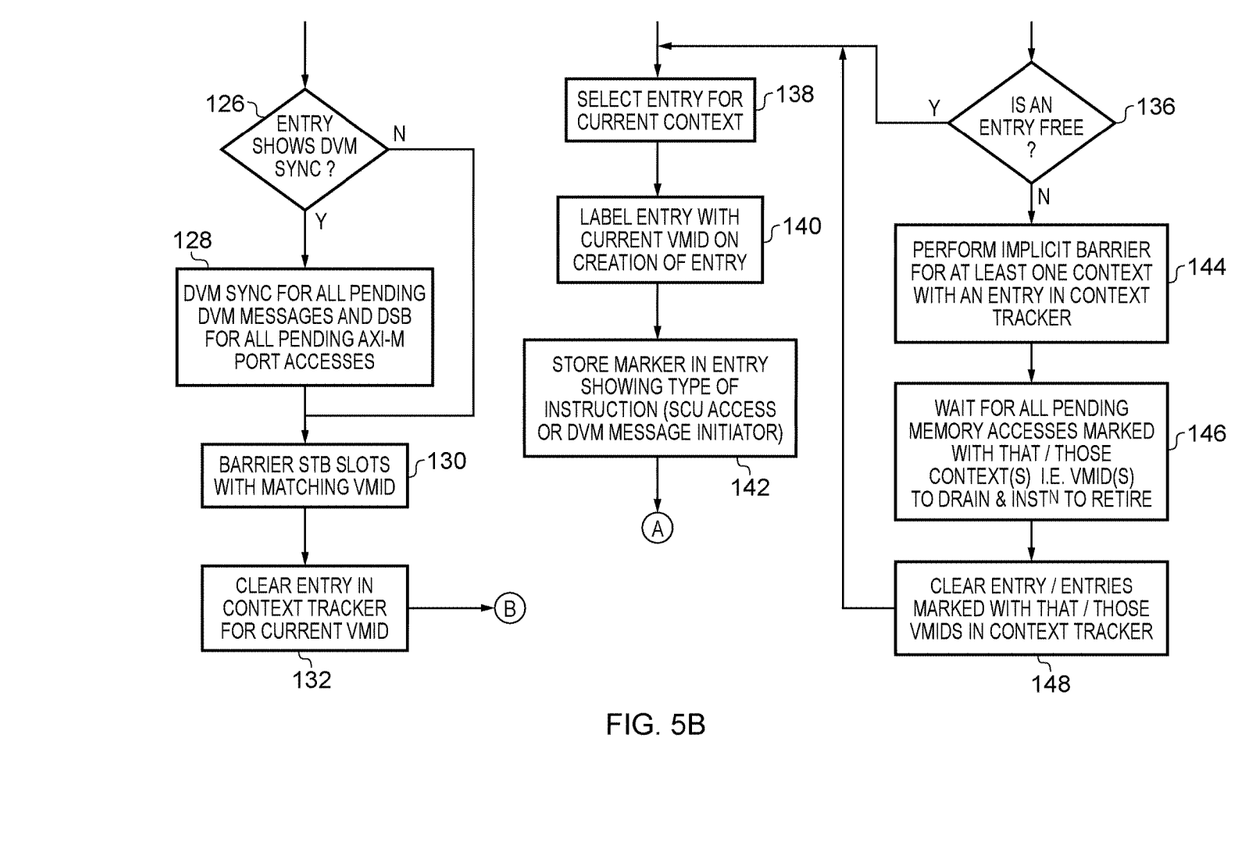

FIGS. 5A and 5B show a sequence of steps which are carried out by the store buffer 56 shown in FIG. 4 in one embodiment. In this example the store buffer uses the current VMID/context (i.e. not a VMID specified in the barrier instruction). The flow can be considered to begin at step 110, where an instruction retires and is received by the control unit 90 of the store buffer 56. It is then determined at step 112 if this instruction is a barrier instruction. If it is not then the flow proceeds to step 114, where the control unit 90, with reference to the relevant memory address range 98 and list of coherency instructions 100, determines if the instruction is a store to the AXI master port (via the SCU), a DVM coherency instruction or a data cache maintenance operation. If it is not then the flow proceeds to step 116 where the access instruction may either be passed directly onto the target part of the memory system, or if necessary is pended in a buffer slot of the multiple STB buffer slots until it can be dealt with. When stored in one of the buffer slots 92 in this manner, the associated VMID indication is also stored in association with that buffer slot in the storage 94 provided for this purpose. The flow then returns to step 110.

If however, at step 112 it is determined that the retired instruction is a barrier instruction, then the flow proceeds to step 118, where it is determined with reference to the context tracker 96 if the context tracker has an entry with the current VMID (context) indication. If it does not, then the flow proceeds to step 120, where the store buffer 56 enforces the corresponding ordering constraint for this barrier instruction for the current context, i.e. only store buffer slots with a matching VMID are barriered. The flow then returns to step 110.

If, however, at step 118, it is determined that the context tracker does have an entry marked with the current VMID (an indication of which was received in association with this barrier instruction), then the flow proceeds to step 122, where it is checked if that entry indicates that the SCU marker is set in association with this entry, indicating that the context to which this barrier instruction applies (i.e. by reference to VMID indications) has sent AXI master stores, or other cache maintenance operations, to the SCU (a "SCU access") since the last barrier was carried out for this context (VMID). If the SCU marker is set then the flow proceeds to step 124 and the barrier is sent to the SCU. Otherwise the flow skips directly to step 126. At step 126 it is similarly determined if the entry in the context tracker with the corresponding VMID indication indicates that the context to which the barrier applies (i.e. the VMID indication received in association with this barrier instruction) has sent DVM messages since the last DVM synchronisation was carried out for this context. If the DVM sync marker is not set then the flow skips directly to step 130. If, however, the DVM sync marker is set then the flow proceeds via step 128 where the barrier instruction results in a DVM sync for all pending DVM messages, followed by a data synchronisation barrier (DSB) for all pending AXI master port accesses. Then at step 130 any store buffer slots with a matching VMID are also barriered and, once all of these accesses have drained, the entry in the context tracker with the matching VMID is cleared at step 132. The flow then returns to step 110.

Returning to a consideration of step 114, if it is determined that the retired instruction is a store to the AXI master port (via the SCIS) or is a DVM coherency instruction, then the flow proceeds to step 134, where it is determined if the context tracker has an entry for the current context (i.e. with a matching VMID). If it does, or if at step 136 it is determined that there is an entry free in the context tracker, then the flow proceeds to step 138, where that entry is selected for use by the current context. Then, at step 140 the entry is labelled with the current VMID and at step 142 the corresponding marker is set, indicating the type of instruction, i.e. whether this represents a SCU access, or is an instruction which sends a DVM message. The flow then proceeds to step 116, where if necessary the access associated with this instruction is allocated to a buffer slot of the store buffer, labelled with the current VMID value. Thereafter as before, as before, the flow proceeds back to step 110.

If, however, at step 136 it is determined that there are no entries currently available in the context tracker 96, then the flow proceeds to step 144, where the store buffer performs an implicit barrier for at least one context with an entry in the context tracker, where it should be understood that "implicit" reflects the fact that this barrier has not been initiated by reception of a retired barrier instruction received by the store buffer but has been initiated of the store buffer's own accord, and thus at step 146 the store buffer waits for all pending accesses marked with the relevant context(s), i.e. with matching VMID(s), to drain and for the retired instruction which the store buffer is currently handling to retire. Thereafter, at step 148, the corresponding entry or entries in the context tracker are cleared, and the flow proceeds via step 138, as described above.

Figure 6A:
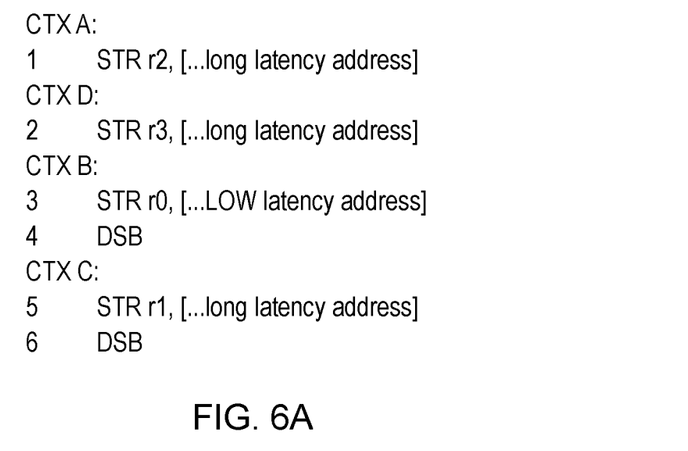
FIGS. 6A and 6B each give an example sequence of instructions which may be executed by processing circuitry in one embodiment.
Figure 6B:
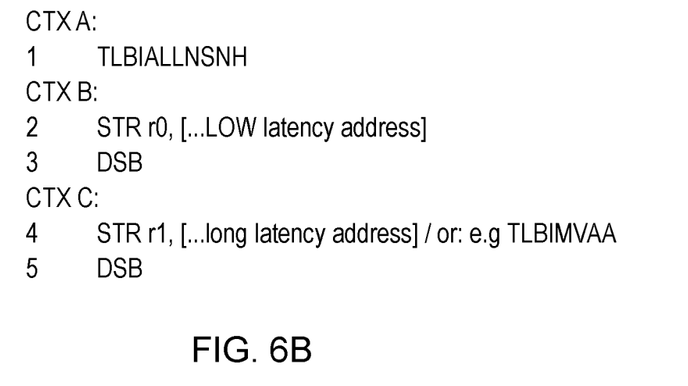

FIGS. 6A and 6B each give an example sequence of data processing instructions, also showing the context in which each of these instructions is executed, to further illustrate the operation of the store buffer. Referring to FIG. 6A, the store (STR)—instruction 1—executed within context A is identified by the store buffer as relating to a long latency address (e.g. via the SCU to the AXI master port) and therefore an entry is made in the context tracker for this context with the SCU access marker set. After instruction 2 (also a store to an identified long latency address) retires, the store buffer adds context D to an entry in the context tracker, with the SCU access indication marked. Instruction 3 is a store to a low latency address and therefore an entry is not made in the context tracker for context B. When instruction 4 (the data synchronisation barrier (DSB)) retires, as this context does not have a corresponding entry in the context tracker, the store buffer does not propagate the bather to the SCU and thus avoids waiting for any AXI master port storage which is currently in progress (for other contexts) and must only wait for stores to low latency portions of the memory (via corresponding low latency ports). When instruction 5 (a store to a long latency address, i.e. via the SCU to the AXI master port) retires if the context tracker of the store buffer has three or more entries available (as in the example embodiment given in FIG. 4) an entry is made in the context tracker for context C (marked with the corresponding VMID and SCU access). Instruction 6 (the DSB) will then have to wait for all earlier AXI master port accesses to complete before it can retire, by virtue of the fact that an entry has been made in the context tracker for this context (VMID) and the SCU marker has been set, indicating that this is a "high latency context". If, however, the context tracker of the store buffer were only to have two possible entries, then at this point in the progress through the sequence of instructions shown in FIG. 6A there would not be an entry available for context C (since these two entries have already been occupied for context A and context D) and the store buffer thus inserts an implicit barrier for at least one of the high latency contexts A and D which are occupying the entries of the context tracker, and then waits for all accesses affected by this implicit barrier to drain. Once all of these accesses have drained, one (or both) entries in the context tracker will be empty and the required entry for context C can be added to the tracking list as the store (instruction 5) retires. The store will have been prevented from retiring for that. Then, the DSB (instruction 6) will wait for all AXI master accesses (the high latency accesses) which at this point in this example sequence of instruction shown in FIG. 6A should only be the instruction 5 store, as all earlier accesses should have been barriered by the implicit DSB inserted.

Now considering the example sequence of instruction shown in FIG. 6B, after instruction 1 (a TLB maintenance operation) retires, the store buffer adds an entry to the context tracker indicating that context A has performed DVM operations (and therefore is categorized here as a "non real-time" context). Instruction 2 is recognised as targeting a low latency address (i.e. not via the SCU to the AXI master port) and a corresponding entry is thus not made in the context tracker. When instruction 3 (the DSB) retires it will not have to wait for any pending AXI master port stores (since these could only apply to other contexts) and it will only have to wait for stores to low latency memory addresses (via identified low latency ports). It will also avoid sending any sort of DVM synchronisation operation, as this context has not performed any DVMs itself (which the store buffer can identify by the lack of a corresponding entry (and therefore necessarily lack of a corresponding DVM synchronisation marker for this context) in the context tracker). After instruction 4 (either a store to a long latency address or another TLB maintenance operation) retires, the store buffer adds an entry for context C to the context tracker marking this entry as an SCU access or marking this entry with the DVM sync marker indicating that context C has performed a DVM operation. Then when instruction 5 (the DSB) retires one of the two following possibilities occurs depending on whether instruction 4 is the store (STR) or the TLB invalidate (TLBIMVAA). If instruction 4 is a store, the DSB barrier will affect this store and all other stores to the AXI master port currently being handled by the data processing system, but does not result in a DVM sync being sent out from the store buffer. On the other hand, if instruction 4 was a TLB invalidate, the DSB barrier (instruction 5) will result in a DVM sync for all earlier DVM messages, followed by a DSB affecting all previous AXI master port accesses.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus for data processing comprising:
   processing circuitry to execute data processing instructions to perform data processing operations, wherein the data processing operations comprise accessing a memory system, and wherein the processing circuitry is capable of executing the data processing instructions in a plurality of contexts; and
   memory system interaction circuitry to provide an interface between the processing circuitry and the memory system,
   wherein the memory system interaction circuitry is capable of, in response to the processing circuitry executing a given barrier instruction in a current context of the plurality of contexts, enforcing a given access ordering constraint,
   wherein the memory system interaction circuitry comprises a store buffer to buffer pending accesses and the store buffer is capable of tagging each pending access with an identifier indicative of the context from which that pending access was issued,
   wherein the memory system interaction circuitry is capable of limiting enforcement of the given access ordering constraint to accesses initiated by the processing circuitry when operating in an identified context,
   wherein the store buffer comprises a context tracking storage with multiple storage locations, and wherein the store buffer is capable of storing an entry in one of the multiple storage locations for the current context when the current context has initiated accesses since the given access ordering constraint was last enforced for the current context, and
   wherein when all of the multiple storage locations in the context tracking storage are occupied and the store buffer does not have an occupied entry for the current context, the storage buffer is capable of enforcing an implicit access ordering constraint for pending accesses initiated by a victim context other than the current context which has a corresponding victim entry, and clearing the victim entry for a selected context, wherein the implicit access ordering constraint does not require the processing circuitry to execute a corresponding barrier instruction.

2. The apparatus as claimed in claim 1, wherein the identified context is the current context.

3. The apparatus as claimed in claim 1, wherein the identified context is specified in the given barrier instruction.

4. The apparatus as claimed in claim 1, wherein the apparatus is capable of providing a virtualized operating environment in which a current virtual machine of multiple virtual machines operates, wherein the processing circuitry is capable of executing the data processing instructions by interaction with the current virtual machine, and wherein the current context corresponds to the current virtual machine.

5. The apparatus as claimed in claim 4, wherein the apparatus further comprises virtual machine identifier storage for storing a virtual machine identifier, wherein the apparatus is capable of updating the virtual machine identifier to indicate the current virtual machine.

6. The apparatus as claimed in claim 1, wherein the store buffer is capable of limiting enforcement of the given access ordering constraint to pending accesses tagged with the identifier indicative of the context from which that pending access was issued which matches the current context.

7. The apparatus as claimed in claim 6, wherein the memory system interaction circuitry further comprises a coherency unit and the store buffer is capable of interacting with the memory system via the coherency unit.

8. The apparatus as claimed in claim 1, wherein the store buffer is capable of clearing a selected entry in the context tracking storage when the given access ordering constraint corresponding to the selected entry has been enforced.

9. The apparatus as claimed in claim 1, wherein the store buffer is capable of storing at least one indication associated with each entry in the context tracking storage indicative of whether the accesses initiated since the given access ordering constraint was last enforced for a context comprise at least one type of access.

10. The apparatus as claimed in claim 1, wherein the apparatus is capable of limiting enforcement of the given access ordering constraint to a selected type of pending access initiated by execution by the current context of a corresponding type of access instruction when the current context has executed the corresponding type of access instruction since the given access ordering constraint for the current context was last carried out.

11. The apparatus as claimed in claim 10, wherein the selected type of pending access is a store operation.

12. The apparatus as claimed in claim 11, wherein the memory system interaction circuitry is capable of limiting enforcement of the given access ordering constraint when the store operation is to a selected memory region.

13. The apparatus as claimed in claim 10, wherein the selected type of pending access is a coherency operation.

14. The apparatus as claimed in claim 1, wherein the identified context is specified in storage accessible to the processing circuitry.

15. A method of data processing, the method comprising the steps of:
   executing data processing instructions to perform data processing operations, wherein the data processing operations comprise accessing a memory system, and the data processing instructions are executed in a current context of a plurality of contexts;
   in response to execution of a barrier instruction in the current context of the plurality of contexts, enforcing an access ordering constraint,
   buffering pending accesses in a store buffer and tagging each pending access with an identifier indicative of the context from which that pending access was issued;
   limiting enforcement of the access ordering constraint to accesses initiated when executing data processing instructions in an identified context;
   storing an entry for the current context in one of multiple storage locations of a context tracking storage when the current context has initiated accesses since the access ordering constraint was last enforced for the current context, and when all of the multiple storage locations in the context tracking storage are occupied and when the store buffer does not have an occupied entry for the current context, enforcing an implicit access ordering constraint for pending accesses initiated by a victim context other than the current context which has a corresponding victim entry, and clearing the victim entry for a selected context, wherein the implicit access ordering constraint does not require execution of a corresponding barrier instruction.

16. Apparatus for data processing comprising:

means for executing data processing instructions to perform data processing operations, wherein the data processing operations comprise accessing a memory system, and the data processing instructions are executed in a current context of a plurality of contexts; and means for providing an interface between the means for executing data processing instructions and the memory system, wherein the means for providing an interface is capable of, in response to the means for executing data processing instructions executing a barrier instruction in the current context of the plurality of contexts, enforcing an access ordering constraint, wherein the means for providing an interface comprises a circuit for buffering pending accesses capable of tagging each pending access with an identifier indicative of the context from which that pending access was issued, wherein the means for executing data processing instructions is capable of limiting enforcement of the access ordering constraint to accesses initiated by the means for executing data processing instructions when operating in an identified context, wherein the circuit for buffering pending accesses comprises a circuit for context tracking with multiple storage locations, and wherein the circuit for buffering pending accesses is capable of storing an entry in one of the multiple storage locations for the current context when the current context has initiated accesses since the access ordering constraint was last enforced for the current context, and wherein when all of the multiple storage locations in the circuit for context tracking are occupied and the circuit for buffering pending accesses does not have an occupied entry for the current context, the circuit for buffering pending accesses is capable of enforcing an implicit access ordering constraint for pending accesses initiated by a victim context other than the current context which has a corresponding victim entry, and clearing the victim entry for a selected context, wherein the implicit access ordering constraint does not require the means for executing data processing instructions to execute a corresponding barrier instruction.

* * * * *